United States Patent [19]
Yamaoka

[11] Patent Number: 5,357,584
[45] Date of Patent: Oct. 18, 1994

[54] METHOD AND APPARATUS FOR COMPRESSING AND EXTENDING AN IMAGE

[75] Inventor: Kensuke Yamaoka, Hokkaido, Japan

[73] Assignee: Hudson Soft Co., Ltd., Japan

[21] Appl. No.: 11,681

[22] Filed: Feb. 1, 1993

[30] Foreign Application Priority Data

Feb. 7, 1992 [JP] Japan .................................. 4-056000

[51] Int. Cl.⁵ .............................................. G06K 9/36
[52] U.S. Cl. ...................................... 382/56; 348/403
[58] Field of Search ..................... 358/261.4, 12, 141, 358/133, 433, 98; 382/22, 41, 43, 49, 56; 348/45, 17, 384, 290, 426, 441, 403

[56] References Cited
U.S. PATENT DOCUMENTS

| | | | |
|---|---|---|---|
| 4,754,492 | 6/1988 | Malvar | 382/41 |
| 4,777,620 | 10/1988 | Shimoni et al. | 364/900 |
| 4,825,285 | 4/1989 | Speidel et al. | 358/133 |
| 4,903,317 | 2/1990 | Nishihara et al. | 382/56 |
| 5,020,120 | 5/1991 | Weldy | 382/56 |
| 5,021,891 | 6/1991 | Lee | 358/432 |

*Primary Examiner*—Joseph Mancuso
*Attorney, Agent, or Firm*—Laff, Whitesel, Conte & Saret

[57] ABSTRACT

An image evaluation circuit is connected to an image compression circuit and an image extension circuit. In the image evaluation circuit, original image data and extended image data reproduced from compressed image data are compared in each block pixel by pixel to generate block noise. The comparison is carried out twice to provide two block noises by two compression factors, and an optimum compression factor is determined in accordance with the two compression factors and the two block noises.

3 Claims, 2 Drawing Sheets

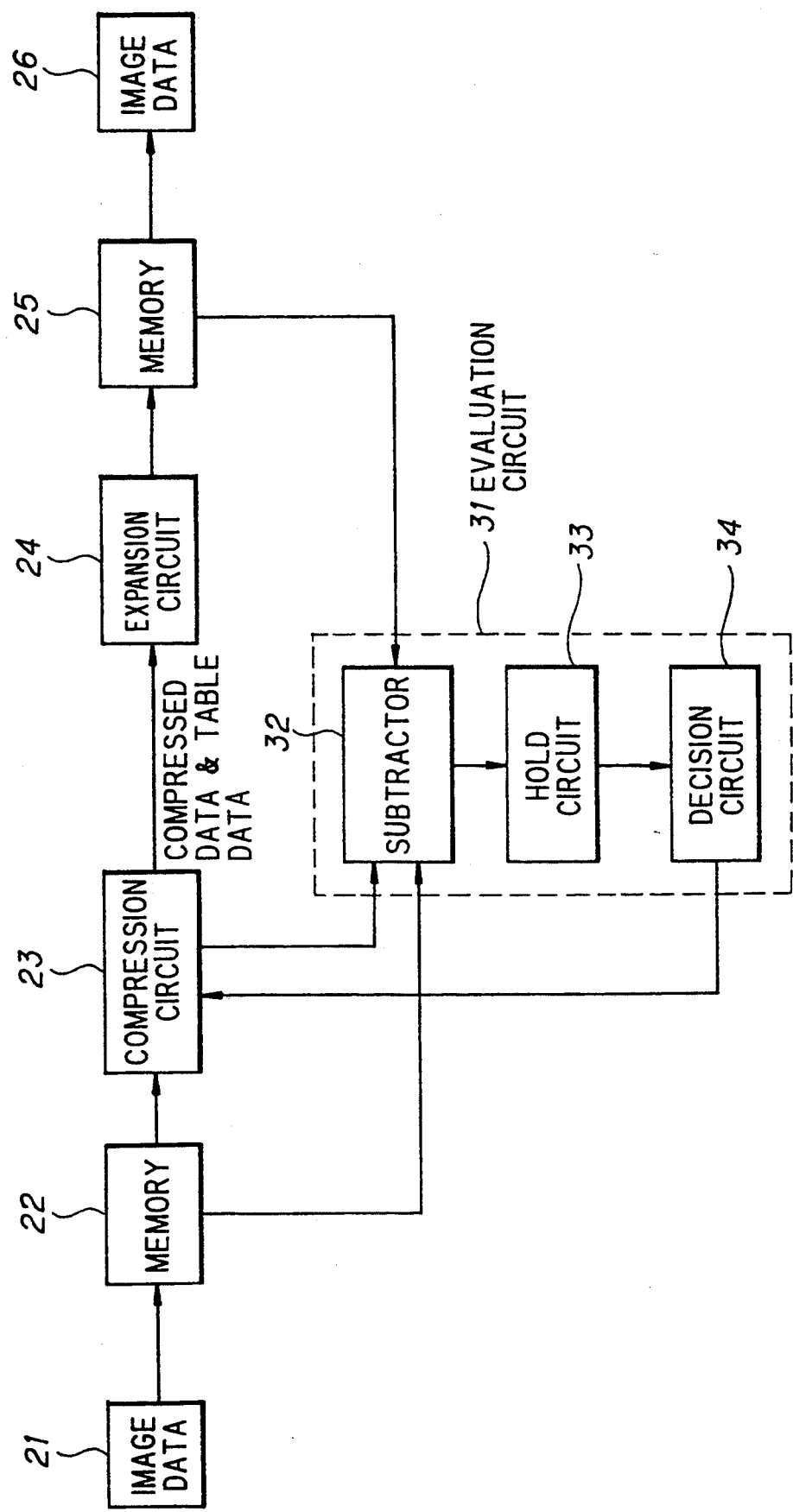

METHOD AND APPARATUS FOR COMPRESSING AND EXTENDING AN IMAGE

FIELD OF THE INVENTION

The invention relates to a method and an apparatus for compressing and expanding an image, and more particularly to a method and an apparatus for evaluating an image by comparing an original image and an expanded image.

BACKGROUND OF THE INVENTION

In a conventional facsimile or television-telephone set, transmission data is compressed and encoded so that the data transmission amount is decreased. As a method for compressing image data, an estimate encoding method and a transformation encoding method are utilized conventionally. In the estimate encoding method, a signal to be next supplied is estimated in accordance with a signal which has been known by decoding an encoded signal, so that only a signal component which is different in the estimation from a correct signal is transmitted to decrease the amount of information to be encoded.

In the transformation encoding method, only coefficients of components, signal electric power of which converges on a low frequency region, are encoded to decrease the amount of information, because the signal electric power of image signals having high correlation is distributed mainly on the low frequency region. That is, the correlation of the image signals is positively utilized, so that higher compression effect is obtained in the transformation encoding method than in the estimation encoding method. However, the amount of arithmetic logic processes is larger in the transformation encoding method than in the estimation encoding method, so that the practical use of the transformation encoding method has been delayed as compared to the estimation encoding method.

In accordance with the development of computer technology, however, the calculation of orthogonal transformation required for the transformation encoding method has been easy in these days, so that the transformation encoding method has been widely used in the encoding of images. As an orthogonal transformation to a frequency region, DCT (discrete cosine transformation) is considered to be most effective for practical uses, because DCT is superior in regard to electric power converging on a low frequency region and the process speed of calculation algorithm. Among other orthogonal transformations than DCT, slant transformation, hurl transformation, etc. can be used in encoding images.

According to the conventional image compression method using DCT, however, there is a disadvantage in that an optimum compression factor is difficult to be set therein. That is, when coefficients are coarsely quantized, a data compression factor becomes large to deteriorate the quality of image. In other words, the process of the image compression is carried out with high speed, while block distortion, which is discontinuity at boundaries of blocks is generated in reproducing images. On the other hand, when the coefficients are finely quantized, the data compression factor becomes small to decrease the block distortion, while a high speed process is hindered, and the process of pictures having fast motion is difficult to be carried out.

SUMMARY OF THE INVENTION

Accordingly, it is an object of the invention to provide a method and an apparatus for compressing and expanding an image in which an optimum compression factor is selected to maintain the quality of the image and to avoid the decrease of the process speed.

According to the first feature of the invention, an apparatus for compressing and expanding an image, comprises:

a compression circuit for compressing image data to provide compressed image data by a predetermined compression factor;

an expansion circuit for expanding the compressed image data to provide reproduced image data by expansion data corresponding to the predetermined compression factor; and an evaluation circuit for evaluating the predetermined compression factor to provide an optimum compression factor in accordance with comparison between the image data and the reproduced image data, the optimum compression factor being used in place of the predetermined compression factor for a subsequent compressing process by the compression circuit.

According to the other feature of the invention, a method for compressing and expanding an image, comprises the steps of;

compressing image data to provide first compressed image data by a first compression factor;

expanding the first compressed image data to provide first reproduced image data by data corresponding to the first compression factor; and comparing the image data and the first reproduced image data in each block pixel by pixel to provide first block noise; and generating an optimum compression factor in accordance with the first compression factor and the first block noise, the optimum compression factor being used for subsequently compressing the image data.

BRIEF DESCRIPTION OF THE DRAWINGS

The invention will be described in more detail in conjunction with appended drawings, wherein:

FIG. 2 is a block diagram showing an apparatus for compressing and expanding an image of a preferred embodiment according to the invention.

DESCRIPTION OF THE PREFERRED EMBODIMENT

Figure 1:
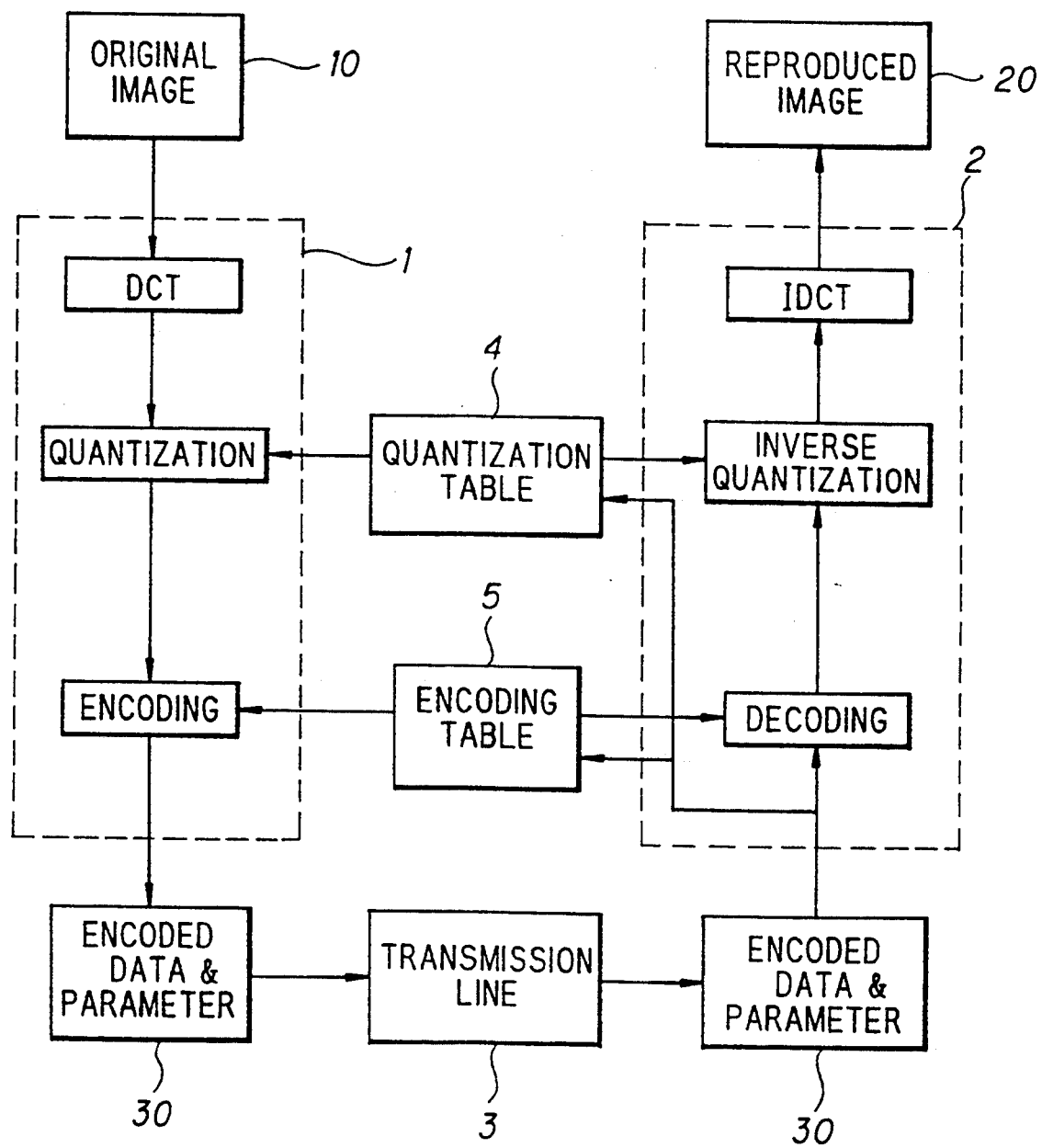
FIG. 1 is a block diagram showing an image compression apparatus using DCT.

Before explaining a method and an apparatus for compressing and expanding an image of a preferred embodiment according to the invention, the background of the invention will be explained.

With reference to FIG. 1, an image data compression apparatus using a standard DCT method will be explained. The apparatus comprises a transmitter (compression circuit)1, a receiver (expansion circuit) 2, and a transmission line 3, wherein image data 10 which is divided into blocks each having 8×8 pixels (dots) is supplied to the transmitter 1, and reproduced image data 20 is supplied from the receiver 2.

In the transmitter 1, the two dimensions DCT transformation is carried out for each block in accordance with a following transformation equation.

$$S_{uv} = \frac{1}{4} C_u C_v \sum_{x=0}^{7} \sum_{y=0}^{7} (P_{xy} - L_s) \cos\frac{(2x+1)u\pi}{16} \cos\frac{(2y+1)v\pi}{16}$$

In the above equation, x and y are positions of a pixel, and u and v are positions of a DCT coefficient, wherein Cu and Cv are $$\frac{1}{\sqrt{2}},$$

when u and v are zero, Cu and Cv are 1, when u and v are other values, Ls is 128, when a bit precision for a pixel value Pxy is of 8 bits, and Ls is 2048, when the bit precision is of 12 bits.

As a result of this transformation, 64 coefficients Suv are obtained in each block, among which a coefficient Soo is called DC coefficient indicating a mean value (direct current component) of 64 pixels in a block, while the remaining coefficients are called AC coefficients. In accordance with this transformation, 8×8 pixels of a block are defined by a linear coupling of 64 DCT fundamental vectors.

In this DCT transformation, electric power of ordinary images is distributed mainly on a low frequency region. By using this property, image compression is realized to carry out quantization in which a small number of bits are allocated to coefficients of a low frequency component, and a large number of bits are allocated to coefficients of a high frequency component.

The coefficient Suv is quantized at each coefficient position in a step size different from others by using a quantization table 4. When the quantization is coarsely carried out by decreasing the number of quantization levels, the amount of data can be decreased. In this case, a data compression factor becomes large, while the deterioration can not be avoided in quality of images, if the coarse quantization is made without any consideration. As a result, discontinuity occurs at boundaries of blocks, and error occurs due to the drop of data. Thus, block distortion is increased in the quantization.

On the other hand, when the quantization is finely carried out to result in the decrease of the compression factor, the block distortion is decreased, while the process of motion pictures having a large amount of data is difficult to be carried out. In fact, however, a high frequency component is not included in actual images by a substantial amount. In accordance with this tendency, the coarse quantization is made in the DCT method for higher order coefficients, and the fine quantization is made therein for lower order coefficients. Consequently, the encoding of data can be carried out with a high efficiency, while the quality of images is not lowered.

Practically, the decision of a compression factor is made in accordance with the selection of an appropriate compression factor from plural compression factors by an operator. For this purpose, quantization tables corresponding to plural compression factors are accessed in a compression circuit to quantize coefficients of the transformation equation. At this time, almost all of the high frequency component is deleted.

The quantized coefficients are encoded in accordance with entropy encoding by using an encoding table 5. For this purpose, Hoffman encoding method is often used. Then, encoded data is transmitted from the transmitter 1 via the transmission line 3 to the receiver 2 together with a parameter including information as to which table is used.

In the receiver 2, the encoded data is decoded to provide the quantized data by referring to the transmitted encoding table 5. The quantized data is inversely quantized to provide the DCT coefficients by referring to the transmitted quantization table 4. In accordance with the property of the quantization, completely original DCT coefficients are not restored. In this sense, the DCT method is defined as a non-inversible encoding method. Then, the DCT coefficients are inversely transformed to the reproduced image data 20 of blocks each having 8×8 pixels.

As described above the original image data 10 is processed in the transmitter 1 to be the compression data 30 in accordance with the orthogonal transformation, the quantization and the variable length encoding and the compression data 30 is expanded in the receiver 2 to provide the reproduced image data 20 in accordance with the decoding, the inverse quantization and the inverse orthogonal transformation.

Next, an apparatus for compressing and expanding an image data of a preferred embodiment according to the invention will be explained in FIG. 2. The apparatus comprises a memory 22 for storing image data 21, a compression circuit 23 for compressing image data read from the memory 22, and expansion circuit 24 for expanding the compressed image data, a memory 25 for storing and providing the expanded image data 26, and an evaluation circuit 31 comprising a subtracter 32 for carrying out a subtraction between image data pixels of each block read from the memories 22 and 25, a hold circuit 33 for holding the subtraction result as a block noise, and a decision circuit 34 for making a decision of an optimum compression factor in accordance with the subtraction results.

In operation, the image data 21 is stored in the memory 22, from which the image data is read to be supplied to the compression circuit 23. Then, the image data is compressed in the compression circuit 23 by a compression factor A. The compressed data and table data corresponding to the compression factor A are transmitted to the expansion circuit 24, and the compression factor A is supplied to be held in the hold circuit 33. In the expansion circuit 24, the compressed data is expanded in accordance with the transmitted table data to provide reproduced image data which is then stored in the memory 25.

In the evaluation circuit 31, the subtracter 32 compares pixels read from the memories 22 and 25 in each block, so that the difference is detected therein as a block noise A which is held in the hold circuit 33. In accordance with the block noise A, a compression factor B is determined in the decision circuit 34 to be supplied to the compression circuit 23.

In the compression circuit 23, image data read from the memory 22 is compressed by the compression factor B, and the compressed data and table data corresponding to the compression factor B are transmitted to the expansion circuit 24, in which the compressed data is extended by referring to the transmitted table data. The expanded data is stored in the memory 25, and image data read from the memories 22 and 25 are compared in the subtracter 32 in the same manner as in the case of using the compression factor A, so that a block noise B is detected to be stored in the hold circuit 33.

Then, an optimum compression factor is determined in the decision circuit 34 in accordance with the compression factors A . B and the block noises A . B, so that the optimum compression factor thus obtained is supplied from the decision circuit 34 to the compression circuit 23, in which image data is compressed by the optimum compression factor.

In making the decision of the optimum compression factor by the decision circuit 34, the compression factor B is determined to be small, where the block noise A is considerably large, because it is considered that the compression factor A is much larger than the optimum compression factor, while the compression factor B is determined to be larger than the compression factor A, where the block noise A is small. At any rate, an error of the optimum compression factor can be small by setting the optimum compression factor between the compression factors A and B.

In the preferred embodiment, an optimum compression factor is applied to the aforementioned DCT algorithm, so that image data becomes improved in quality by suppressing block noise providing visual problem and the encoding of image data is carried out with high efficiency.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. An apparatus for compressing and expanding an image, comprising;
   a compression circuit for compressing image data to provide compressed image data by a predetermined compression factor;
   said compression circuit, comprises:
   means for transforming said image data to provide transformed image data by using a discrete cosine transformation;
   means for quantizing said transformed image data to provide quantized image data in accordance with quantization table data corresponding to said predetermined and optimum compression factors;
   means for encoding said quantized image data to provide encoded image data in accordance with encoding table data; and
   means for transmitting said encoded image data along with said quantization and encoding table data to said expansion circuit;
   an expansion circuit for expanding said compressed image data to provide reproduced image data by expansion data corresponding to said predetermined compression factor;
   said expansion circuit, comprises;
   means for receiving said encoded image data along with said quantization and encoding table data;
   means for decoding said encoded image data to provide said quantized image data in accordance with said encoding table data;
   means for inversely quantizing said quantized image data to provide said transformed image data in accordance with said quantization table data; and
   means for inversely transforming said transformed image data to provide said reproduced image data by using said discrete cosine transformation;
   an evaluation circuit for evaluating said predetermined compression factor to provide an optimum compression factor in accordance with a comparison between said image data and said reproduced image data, said optimum compression factor being used in place of said predetermined compression factor for a subsequent compressing process by said compression circuit;
   said evaluation circuit, comprises:
   means for comparing said image data and said reproduced image data in each block pixel by pixel to provide block noise;
   means for holding said block noise; and
   means for generating said optimum compression factor in accordance with said predetermined compression factor and said block noise.

2. A system according to claim 1 for compressing and expanding imaging signals especially for facsimile and television-telephones, said system comprising imaging means for providing said image data representing images to be transmitted, first memory means for storing said image data pending compression, a plurality of memory tables for furnishing criteria concerning the best compression for any given image, said compression circuit comprising compression means for compressing and transmitting imaging signals taken from said first memory means along with information relative to a selected one of said tables used for said compression, said expansion circuit comprising a second memory means, expansion means responsive to a reception of said compressed and transmitted image signals for expanding and storing said received signals in said second memory means, subtractor means for subtracting said image signals in said first memory means from said image signals in said second memory means, said evaluation circuit comprising decision means responsive to said subtractor means for deciding upon said optimum compression factor, and means responsive to said decision means for causing said compression means to transmit the next of said image data according to said optimum compression factor.

3. The system of claim 2 wherein said image signal is divided into pixels, and said subtractor means performs said subtraction on a pixel by pixel basis.

* * * * *